US012682507B2

(12) United States Patent
McElligott

(10) Patent No.: US 12,682,507 B2
(45) Date of Patent: Jul. 14, 2026

(54) SYSTEM AND METHOD FOR GENERATING REAL-TIME SYNTHETIC IMAGERY DURING AIRCRAFT FLIGHT

(71) Applicant: Goodrich Lighting Systems, Inc., Phoenix, FL (US)

(72) Inventor: Michael McElligott, Cork (IE)

(73) Assignee: GOODRICH LIGHTING SYSTEMS, INC., Phoenix, FL (US)

( * ) Notice: Subject to any disclaimer, the term of this patent is extended or adjusted under 35 U.S.C. 154(b) by 137 days.

(21) Appl. No.: 18/408,795

(22) Filed: Jan. 10, 2024

(65) Prior Publication Data
US 2024/0233203 A1 Jul. 11, 2024

(30) Foreign Application Priority Data
Jan. 10, 2023 (EP) .................................... 23151026

(51) Int. Cl.
*G06T 11/00* (2026.01)
*G01C 21/20* (2006.01)

(52) U.S. Cl.
CPC .............. *G06T 11/00* (2013.01); *G01C 21/20* (2013.01)

(58) Field of Classification Search
CPC ......... G06T 11/00; G01C 21/20; G01C 23/00; B64D 11/0015; B64D 47/08; B64D 2011/0061; G08G 5/21
See application file for complete search history.

(56) References Cited

U.S. PATENT DOCUMENTS

| | | | | |
|---|---|---|---|---|
| 5,488,563 | A * | 1/1996 | Chazelle | .................. G08G 5/26 |
| | | | | 340/970 |
| 7,483,696 | B1 * | 1/2009 | Mitchell | ........... H04B 7/18508 |
| | | | | 455/431 |
| 8,649,915 | B2 | 2/2014 | Vlad et al. | |
| 9,787,948 | B2 | 10/2017 | De Carvalho et al. | |

(Continued)

FOREIGN PATENT DOCUMENTS

| | | | | |
|---|---|---|---|---|
| EP | 3073225 | A1 * | 9/2016 | ............. G08G 5/723 |
| EP | 3053801 | B1 | 8/2020 | |
| EP | 3879500 | A1 | 9/2021 | |

OTHER PUBLICATIONS

European Search Report for Application No. 23151026.4, mailed Jul. 6, 2023, 9 pages.

*Primary Examiner* — Daniel F Hajnik
(74) *Attorney, Agent, or Firm* — CANTOR COLBURN LLP

(57) ABSTRACT
An extended reality system for generating real-time synthetic imagery during a flight of an aircraft. The system is connectable to a local terrain database via a data network while the aircraft is on the ground and includes: a terrain subset database configured to store a subset of terrain data from the local terrain database; a position database configured to receive a real-time position and orientation of the aircraft during flight; an image generator configured to generate one or more real-time synthetic images of one or more view points from and/or of the aircraft based on the subset of terrain data and the real-time position and orientation of the aircraft; and an encoder 10 configured to convert the one or more real-time synthetic images into one or more media streams. The media streams are configured to be transmitted to one or more display devices via a wireless network.

10 Claims, 1 Drawing Sheet

(56)         References Cited

U.S. PATENT DOCUMENTS

|  |  |  |  |  |  |
|---|---|---|---|---|---|
| 9,864,559 | B2 | 1/2018 | Sizelove | | |
| 10,822,108 | B2 | 11/2020 | Chavez et al. | | |
| 11,094,128 | B2 | 8/2021 | Skelly | | |
| 11,368,660 | B2 | 6/2022 | Ahlborn et al. | | |
| 2002/0069019 | A1 | 6/2002 | Lin | | |
| 2007/0171094 | A1* | 7/2007 | Alter | ..................... | G01C 23/00 |
| | | | | | 340/970 |
| 2008/0195309 | A1 | 8/2008 | Prinzel, III et al. | | |
| 2011/0295445 | A1* | 12/2011 | Vlad | ..................... | G01C 23/00 |
| | | | | | 701/1 |
| 2017/0094166 | A1 | 3/2017 | Riedel | | |
| 2017/0286037 | A1 | 10/2017 | Sizelove | | |
| 2018/0352196 | A1 | 12/2018 | Marin-Martinod | | |
| 2020/0355518 | A1* | 11/2020 | Bilek | ................... | G01C 23/00 |
| 2021/0104099 | A1* | 4/2021 | Skelly | ................ | G06F 3/04815 |
| 2021/0287436 | A1 | 9/2021 | Hausmann | | |
| 2023/0202674 | A1* | 6/2023 | Nagalla | ................. | B64D 45/00 |
| | | | | | 715/744 |
| 2024/0010340 | A1* | 1/2024 | Santos | .............. | G02B 27/0101 |

* cited by examiner

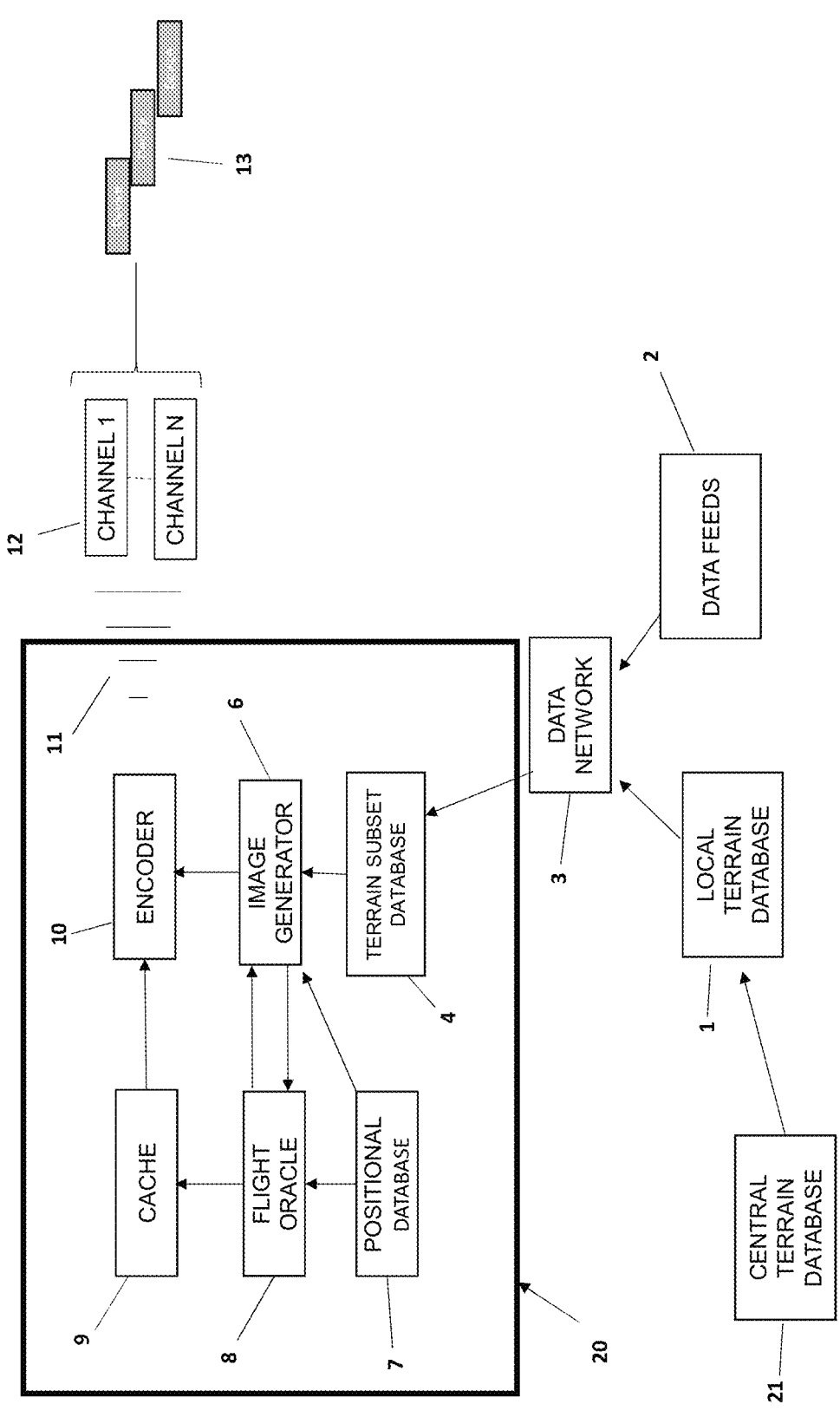

SYSTEM AND METHOD FOR GENERATING REAL-TIME SYNTHETIC IMAGERY DURING AIRCRAFT FLIGHT

CROSS REFERENCE TO RELATED APPLICATION

This application claims priority to European patent application Ser. No. 23/151,026.4 filed Jan. 10, 2023, the entire contents of which is incorporated herein by reference.

FIELD OF INVENTION

The present invention relates to a system and method for generating real-time synthetic imagery of a view outside an aircraft during flight.

BACKGROUND

Passengers onboard aircraft currently have a limited view of the outside world as typical windows are small and in fixed positions, with only a small proportion of seats on the aircraft having access to the windows.

Extended reality applications provide the ability to overlay imagery on real-world environments. However, the process of generating and delivering the required real-time imagery to user devices can be data intensive and highly time-sensitive.

There is therefore a need to provide a system and method for generating and delivering such imagery for real-time flight data in a more efficient manner.

SUMMARY OF INVENTION

Viewed from the first aspect, there is provided an extended reality system for generating real-time synthetic imagery during a flight of an aircraft; wherein the system is connectable to a local terrain database via a data network while the aircraft is on the ground, the system comprising: a terrain subset database configured to store a subset of terrain data from the local terrain database; a position database configured to receive a real-time position and orientation of the aircraft during flight; an image generator configured to generate one or more real-time synthetic images of one or more view points from and/or of the aircraft based on the subset of terrain data and the real-time position and orientation of the aircraft; and an encoder configured to convert the one or more real-time synthetic images into one or more media streams, wherein the one or more media streams are configured to be transmitted to one or more display devices via a wireless network.

The local terrain database may comprise global or regional terrain data, and wherein the system may be configured to receive an updated subset of terrain data from the local terrain database when the aircraft is on the ground.

The terrain subset database may comprise terrain data sufficient for an upcoming flight path or region in which the aircraft operates.

The system may be configured to receive supplementary data for the upcoming flight including one or more of: predicted weather conditions, position of nearby aircraft, and classification of nearby aircraft, points of interest along flight path from a supplementary data feed via the data network while the aircraft is on the ground.

The image generator may be configured to generate the one or more real-time synthetic images based on the supplementary data for the upcoming flight. More specifically, the image generator may be configured to generate the one or more real-time synthetic images based on all of the subset of terrain data, the real-time position and orientation of the aircraft, and the supplementary data for the upcoming flight.

The system may comprise a flight path predictor configured to receive the real-time position and orientation of the aircraft at each time step and predict positions and orientation of the aircraft for one or more future time steps.

The predicted position and orientation of the aircraft for one or more future time steps may be based on the position and orientation of the aircraft for current and previous time steps and a predetermined flight path of the aircraft.

The image generator may be configured to generate one or more sets of future synthetic images of one or more view points from and/or of the aircraft based on the subset of terrain data and the predicted position and orientation of the aircraft for the one or more future time steps.

The system may comprise a cache configured to store the synthetic images generated by the image generator. The cache may be configured to store the synthetic images generated for each of the one or more future time steps.

The encoder may be configured to receive the synthetic images from the cache and/or the image generator directly.

The one or more viewpoints may comprise a pilot view, a seat view and/or an escort view, and each may comprise a plurality of different weather conditions and/or times of day.

The wireless network may comprise one or more separate channels each configured to transmit the one or more media streams to the one or more display devices.

The one or more display devices may be connectable to a single channel of the one or more separate channels.

Viewed from a second aspect, there is provided a method of generating real-time synthetic imagery during a flight of an aircraft, the method comprising; providing a subset of terrain data from a local terrain database; receiving a real-time position and orientation of the aircraft during flight; generating one or more real-time synthetic images of one or more view points from and/or of the aircraft based on the subset of terrain data and the real-time position and orientation of the aircraft; and converting the one or more real-time synthetic images into one or more media streams; and transmitting the one or more media streams to one or more display devices via a wireless network.

The method may comprise corresponding method steps to perform any of the features discussed in relation to the extended reality system described in the first aspect above. Equally, the method may be performed by any of the systems of the first aspect.

BRIEF DESCRIPTION OF FIGURES

Certain preferred embodiments of the present invention will now be described, by way of example only, with reference to the following drawings, in which:

FIG. 1 depicts a system for real-time image generation of aircraft scenery.

DETAILED DESCRIPTION

FIG. 1 depicts an extended reality system 20 which is used to dynamically generate imagery of a virtual world outside an aircraft in real-time in accordance with the position and orientation data of the aircraft. The generated imagery can then be accessed by one or more users, either via dedicated display devices distributed throughout the aircraft or using their personal electronic device.

The system 20 therefore means that any passenger on board the aircraft is able to view a synthetically generated scene representative of the real world surrounding the aircraft during a flight, and are not constrained merely to the window size, or by the current weather patterns.

The system 20 uses a data network 3 which can be used to pull data from a local terrain database 1 in addition to accessing a supplementary data feed 2. is The data network 3 may be a public internet or private enterprise network.

The system 20 is located on an aircraft which is able to access the local terrain database 1 and supplementary data feed 2 via the data network 3. The central terrain database 21 contains planet-wide topological information and would be geographically replicated to local terrain databases 1 that can be efficiently accessed by aircraft for periodic synchronisation such as airports. Supplementary data feeds 2 could be similarly distributed to reduce aircraft synchronization expenses. Supplementary data feeds 2 could also be accessed in realtime through the data network 3 (on the ground and in the air) for feeds that deliver time critical information. Prior to take-off, the system 20 connects to the local terrain database 1 and the supplementary data feed 2 in order to receive the necessary data relevant to the upcoming flight.

The central terrain database 21 includes a global database of 3D topographical data providing a complete mapping of world terrain. A local terrain database 1 may comprise a regional database of 3D topographical data providing a mapping of the relevant region. For example, if a particular aircraft is required to operate within Europe, then the local terrain database 1 may comprise 3D topographical data for Europe only.

In the case of the local terrain database 1 comprising a regional database, a central database 21 may be stored centrally on a cloud server. The central database 21 may be updated at regular intervals and each local terrain database 1 may be connectable to the central database in order to receive a copy of the relevant regional database.

The aircraft system 20 may connect to the nearest local terrain database 1 while it is on the ground to obtain terrain data relevant to the region or flight path the aircraft operates within. The terrain data may be stored locally on the aircraft. The terrain data may comprise a subset of the local terrain database 1. The subset of the local terrain database 1 is stored locally on the aircraft may be sufficient to cover the upcoming flight path of the aircraft. For example, the terrain data stored on the aircraft system 20 may relate to a specific flight path and the local terrain database 1 may comprise a regional or global database, or the terrain data may relate to a specific region and the local terrain database 1 may comprise a global database.

Prior to subsequent flights, the aircraft system 20 may connect to the local terrain database 1 via the data network and determine if a change is detected between the stored terrain database and the relevant subset of the local terrain database 1. If a change is detected, then the aircraft system 20 may receive the updated terrain data relevant to the region of flight path in which it operates. If there is no difference between the stored terrain database and the relevant subset of the local terrain database 1, no data is retrieved by the aircraft system 20. Moreover, any terrain data present in the local terrain database 1 not relevant to the upcoming flight path, or the region in which the aircraft is intended to operate within, is not retrieved by the aircraft system 20.

The 3D topographical data includes information regarding land surfaces at each point on the globe such as specific topological detail such as contour lines providing data on mountains and other types of elevations. Other data types may include the locations and extent of bodies of water such as oceans, as well as cities and building information and airport layouts.

The supplementary data feed 2 includes additional data which can be used to supplement the topographical data provided by the local terrain database 1. Typical data stored in the supplementary data feed 2 may be live localised weather feeds for the upcoming flight and the positions and classifications of nearby aircraft. This data can be used to add realism to the generated imagery in combination with the 3D topographical data stored in the local terrain database 1.

Due to the large storage requirements of the local terrain database 1, the data is stored in a remote server which can be accessed via the data network 3 while the aircraft is on the ground.

In addition to the subset of data from the local terrain database 1, the system 20 on board the aircraft also accesses updated real-time data for the specific flight path from the supplementary data feed 2. This includes the data of the predicted weather patterns for the upcoming flight path. The supplementary data feed 2 also provides information related to flight profiles for other nearby aircraft, and the classification of any nearby aircraft.

The system 20 comprises a position database 7 which includes the real-time status of the aircraft during flight. The data stored within the position database 7 includes the geographical location and altitude of the aircraft, and the orientation, such as the pitch or tilt, of the aircraft. This data can be obtained using conventional sensing systems present on-board an aircraft.

In certain examples, the data from the position database 7 is transmitted directly to an image generator 6 which then generates a real-time synthetic image using the 3D topographical data stored in the terrain subset database 4 for the current position and orientation of the aircraft according to the data from the position database 7. This process is repeated at each position and orientation of the aircraft to generate real-time synthetic imagery of the area surrounding the aircraft.

In other examples, the data regarding the current position and orientation of the aircraft from the position database 7 is provided to a flight path predictor 8. The flight path predictor 8 predicts the position and orientation of the aircraft for one or more future time points along the flight path based on current and historical position and orientation data provided by the position database 7.

In more detail, an aircraft flight path is typically predetermined, and any changes to one or more of geographical location, altitude, pitch and/or tilt of the aircraft are known in advance, including the time at which they are likely to occur, if the current position and orientation of the device is known.

The flight path predictor 8 is therefore able to feed the predicted position and orientation data for a plurality of time steps into the image generator 6. The image generator 6 can then use this data to generate synthetic images using the 3D topographical data stored in the terrain subset database 4 in accordance with the predicted position and orientation data for a plurality of time steps.

The use of the flight path predictor 8 improves the efficiency of the operation as the relevant synthetic images can be generated in advance of the aircraft arriving at the specific position and orientation, thereby alleviating the stringent latency demands that would otherwise be imposed on the computationally intensive process of generating the images in real-time.

The generated synthetic images are then supplied to a cache 9 of pre-rendered synthetic images for a plurality of aircraft positions and orientations as predicted by the flight path predictor 8. This improves the efficiency of the image generator as it is able to pre-render the necessary images, rather than render them in real-time as the aircraft reaches a particular position and orientation. However, it will be appreciated that the system 20 may still operate without the use of a flight path predictor 8 or cache 9, and the image generator 6 may generate the synthetic images in real-time based on the current position and orientation. In this example, the generated images may still be stored within a cache 9. This is beneficial if the aircraft operates the same flight path multiple times as the system 20 can use the cached version of the synthetic image for the same position and orientation for subsequent flight cycles, rather than re-generate the imagery.

The synthetic imagery generated by the image generator 6 does not typically include any photographic imagery. It is instead a synthetic, rendered image based on the topographical data provided by the terrain database 4 and supplementary data provided by the supplementary data feed 2. The image generator 6 therefore effectively provides a stream of synthetic image frames which represent a view outside the aircraft at a plurality of different positions and orientations.

For each position and orientation the image generator 6 generates a set of real-time synthetic images to provide a 360° view surrounding the aircraft. Each image of the set of real-time synthetic images may provide a view of a different portion of the 360° view which may be merged together to form a complete image of the view surrounding the aircraft.

The image generator 6 may generate realistic synthetic imagery based on the real-world conditions at the time when the synthetic image is generated. In addition, the image generator 6 may also generate synthetic images based on the position and orientation for a plurality of viewpoints.

The plurality of viewpoints may include a viewpoint for each seat location within the aircraft or area within the cabin such as the forward, aft or central section of the cabin. The plurality of viewpoints may include a pilot view, or a view from an escort aircraft flying alongside the aircraft. In the escort view, the aircraft itself may be within the view along with its surroundings. The plurality of viewpoints may comprise a view of scenery to the left or right of the aircraft when travelling in a forward direction, or a view directly upwards or directly downwards relative to the pitch and/or roll of the aircraft.

The image generator 6 may generate synthetic images for each of the plurality of viewpoints at one or more times of day, including the current local time. For example, the image generator 6 may generate synthetic images for each of the plurality of viewpoints at either day-time or night-time.

In addition, the image generator 6 may generate synthetic images for each of the plurality of viewpoints for a plurality of different weather conditions. In one example, the generated synthetic images depict the current weather conditions based on the data provided by the supplemental data feed 2 regarding predicted weather conditions for the upcoming flight. The image generator 6 may also generate the viewpoint for weather conditions other than the current weather conditions.

The synthetic images may include other nearby aircraft depending on the position and orientation data and data provided by the supplementary data feed 2 regarding flight profiles of nearby aircraft. The synthetic images may also highlight areas of interest at ground level.

As will be appreciated, at each position and orientation of the aircraft, there can be a large number of generated synthetic images depending on the number of viewpoints, weather conditions and times of day required.

Each rendered synthetic image is transmitted to an encoder 10 which converts the synthetic imagery into one or more media streams suitable for transmission over a wireless network 11 to one or more display devices 13. The encoder 10 may be configured to receive the synthetic imagery directly from the image generator 6. Alternatively, the encoder 10 may be configured to receive the synthetic imagery from the cache 9 of pre-rendered synthetic images.

Each media stream formed by the encoder 10 is transmitted over a wireless network. The wireless network 11 is accessible by one or more display devices. The wireless network 11 may be one or more of a cellular network (e.g. 3G, 4G or 5G) or a WiFi network. The aircraft may be provided with a wireless base station for generating the cellular and WiFi networks. The wireless base station may be configured to allow a user to connect a display device using their normal mobile provider. Alternatively, the wireless base station may be used to generate a private cellular network which can connect to the one or more display devices onboard the aircraft in order to transmit the media stream of synthetic imagery.

The system 20 may comprise a processor which is configured to perform each of the steps required to generate the real-time synthetic images. As such, the method of generating the real-time synthetic images may be a computer-implemented method.

The wireless network 11 may be divided into a plurality of channels 12. Each channel of the plurality of channels 12 may be used to transmit the encoded media stream corresponding to a synthetic media stream of a particular view point and weather condition and/or time of day. For example, a first channel may be configured to transmit a stream of synthetic image frames for a pilot view for the current local time with the current weather conditions. It will be appreciated that there may be a sufficient number of channels to cover each combination of time of day and weather conditions for each of the plurality of viewpoints.

The one or more display devices 13 may be connectable to a channel of the plurality of channels. The channel 12 which the one or more display devices 13 are connected to depends on the preferences of the user. For example, a specific user may decide to view a stream of synthetic image frames for an escort view for the current local time and weather conditions, and so the display device 13 would be connected to the relevant channel of the plurality of channels 12. This arrangement means that data intensive media streams are separated in different channels 12 and each display device 13 can ignore media streams on other channels 12. This arrangement reduces the bandwidth and processing demand for both the display devices 13 and the wireless network 11.

A display device 13 can be any device capable of connecting to the wireless network 11 to receive the encoded media stream, and display the associated synthetic imagery. Examples include screen-enabled electronic devices, such as mobile phones, tablets, computers, extended reality (XR) headsets. These electronic devices may be owned by the users, or may be owned by the aircraft operator and distributed to the passengers onboard.

Each of the one or more display devices 13 may be connectable to a channel of the plurality of channels 12 using an application stored on the device 13. Alternatively, each of the one or more display devices 13 may be connectable to a channel of the plurality of channels 12.

The display device 13 may comprise a display of the aircraft, for example this may include one or more display devices located within the cabin, such as on a wall or located within the seats of the aircraft. Each of the one or more display devices 13 may be viewed by a plurality of different users.

The display devices 13 may be configured to display the synthetic image as received, i.e. without any components of the aircraft present on the display. The user may be able to move the display device 13 to view a different section of the area surrounding the aircraft.

The one or more display devices 13 may be configured to present a mixed reality view which includes the view of the aircraft surroundings according to the synthetic imagery, with sections of the aircraft cabin overlaid on the synthetic imagery. The sections of the aircraft cabin may be recorded by the camera of the one or more display devices 13.

The portion of the aircraft cabin present in the mixed reality view may be selectable by the user of the respective display device. In one example, the users own body, as well as their companies, tray-table and refreshments may be present within the image only, while the remainder of the field of view can be formed by the synthetic imagery. As an alternative, the user may select additional objects to remain in the view such as service staff and all other passages, and wherein only the fuselage of the aircraft is removed from the view.

The above embodiment provides a means for efficiently providing a real-time display of an area surrounding the aircraft to be viewed by each passenger onboard an aircraft.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. An extended reality system for generating real-time synthetic imagery during a flight of an aircraft; wherein the system is connectable to a local terrain database via a data network while the aircraft is on the ground, the system comprising:

a terrain subset database configured to store a subset of terrain data from the local terrain database;

8 a position database configured to receive a real-time position and orientation of the aircraft during flight;

an image generator configured to generate a plurality of real-time synthetic images of one or more view points from or of the aircraft based on the subset of terrain data and the real-time position and orientation of the aircraft;

an encoder configured to convert the plurality of real-time synthetic images into a plurality of media streams, wherein the plurality of media streams are configured to be transmitted to one or more display devices via a wireless network; and a flight path predictor configured to receive the real-time position and orientation of the aircraft at each time step and predict positions and orientation of the aircraft for one or more future time steps;

wherein the predicted position and orientation of the aircraft for one or more future time steps is based on the position and orientation of the aircraft for current and previous time steps and a predetermined flight path of the aircraft;

wherein the image generator is configured to generate one or more sets of future synthetic images of one or more view points from or of the aircraft based on the subset of terrain data and the predicted position and orientation of the aircraft for the one or more future time steps.

2. The extended reality system of claim 1, wherein the local terrain database comprises global or regional terrain data, and wherein the system is configured to receive an updated subset of terrain data from the local terrain database when the aircraft is on the ground.

3. The extended reality system of claim 2, wherein the terrain subset database comprises terrain data sufficient for an upcoming flight path or region in which the aircraft operates.

4. The extended reality system of claim 3, wherein the system is configured to receive supplementary data for the upcoming flight, wherein the supplementary data includes one or more of: predicted weather conditions; position of nearby aircraft; classification of nearby aircraft; and points of interest along flight path from a supplementary data feed via the data network while the aircraft is on the ground.

5. The extended reality system of claim 4, wherein the image generator is configured to generate the plurality of real-time synthetic images based on the supplementary data for the upcoming flight.

6. The extended reality system of claim 1, further comprising:

a cache configured to store the synthetic images generated by the image generator.

7. The extended reality system of claim 6, wherein the encoder is configured to receive the synthetic images from the cache and/or the image generator directly.

8. The extended reality system of claim 1, wherein the one or more viewpoints comprise: a pilot view, a seat view, and an escort view, wherein each view comprises a plurality of different weather conditions or times of day.

9. The extended reality system of claim 1, wherein the wireless network comprises a plurality of separate channels each configured to transmit the plurality of media streams to the one or more display devices.

10. The extended reality system of claim 9, wherein the one or more display devices are connectable to a single channel of the one or more separate channels.

* * * * *